Sept. 13, 1932.   C. E. MAYNARD   1,876,715
DEFLATER CAP
Filed Aug. 15, 1929

INVENTOR.
Charles Edgar Maynard.
BY
ATTORNEY

Patented Sept. 13, 1932

1,876,715

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

DEFLATER CAP

Application filed August 15, 1929. Serial No. 386,075.

My invention relates to deflating caps for air valves such as are used in tubes for pneumatic tires, air bladders, etc., and more especially to a device adapted to be secured to the stem of the valve and engage the pin of the valve inside to hold the latter in open or deflating position.

It is among the objects of my invention to provide a device of this character which may be positioned rapidly and accurately on the valve stem; also to provide a deflater which is economical to manufacture, and still further to provide a deflater which will not damage the threads on the valve stem. Further objects will be apparent from the following specification and claims.

Figure 1:
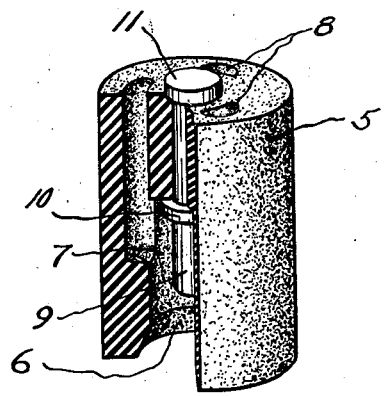
Figure 2:
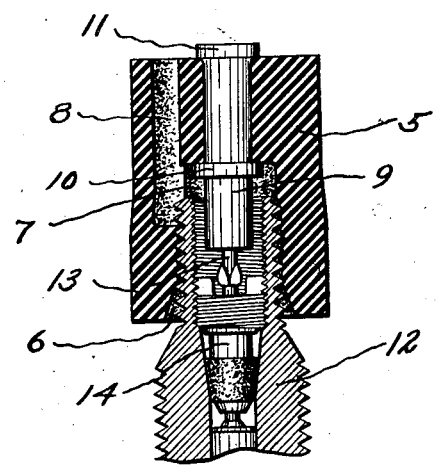

In the accompanying drawing which illustrates one embodiment of my invention,

Fig. 1 is a perspective view of my deflater with a portion broken away to more clearly show its construction; and Fig. 2 is a sectional view showing my deflater positioned on a valve stem assembly and holding the valve inside in deflating position.

Referring to the drawing, 5 indicates a generally cylindrical member formed of rubber and provided with an axial bore 6 enlarged as at 7 to form a chamber. A plurality of ducts 8 lead from one end of the cylinder to the chamber 7. A pin 9 is positioned in the bore 6 and extends into the chamber 7, being held in position by collars 10 and 11. This pin may be formed of any suitable material such as metal or if preferred may be made of rubber integrally molded with the cylinder 5.

In operation the device, as shown in Fig. 2, is forced over the valve stem 12, the walls of chamber 7 gripping the outside threads of the valve stem and pin 9 depressing the pin 13 of the valve inside 14 to hold the valve open. As will be obvious the air within the article may escape through passages or ducts 8 to deflate the article, and if desired the free end of the deflating cap may be inserted in or abutted against a vacuum nozzle to assist in the deflation.

Having thus described my invention, I claim:

A device for use in the deflation of inner tubes for pneumatic tires and the like which comprises a generally cylindrical member formed of resilient rubber, a chamber formed in one end thereof and in which the end of a valve stem is adapted to be engaged to hold the device on the valve stem by the stretching of the walls of the chamber, a pin, formed of non-resilient material, positioned axially in said member and supported directly by the rubber of which said member is formed, one end of said pin projecting into the chamber to yieldingly engage and hold open the valve in the stem by the resiliency of the rubber supporting the pin, and a plurality of longitudinally positioned ducts formed in said rubber member to provide air passages from the chamber to the opposite end face of the rubber member, said ducts being arranged substantially symmetrically around said pin to increase the flexibility of the rubber surrounding the pin.

CHARLES EDGAR MAYNARD.